(12) United States Patent
Ishikawa et al.

(10) Patent No.: US 9,718,187 B2
(45) Date of Patent: Aug. 1, 2017

(54) ROBOT CONTROLLING METHOD, ROBOT APPARATUS, PROGRAM, RECORDING MEDIUM, AND METHOD FOR MANUFACTURING ASSEMBLY COMPONENT

(71) Applicant: CANON KABUSHIKI KAISHA, Tokyo (JP)

(72) Inventors: Takahiro Ishikawa, Kawasaki (JP); Tsutomu Osaka, Yokohama (JP); Shunsuke Kawamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/733,699

(22) Filed: Jun. 8, 2015

(65) Prior Publication Data

US 2015/0360369 A1    Dec. 17, 2015

(30) Foreign Application Priority Data

Jun. 11, 2014  (JP) .................................. 2014-120156

(51) Int. Cl.
*B25J 9/00* (2006.01)
*B25J 9/16* (2006.01)

(52) U.S. Cl.
CPC ... *B25J 9/1674* (2013.01); *G05B 2219/34388* (2013.01); *G05B 2219/37297* (2013.01); *G05B 2219/39098* (2013.01); *Y10S 901/09* (2013.01); *Y10S 901/23* (2013.01); *Y10S 901/25* (2013.01); *Y10T 29/49828* (2015.01); *Y10T 74/20317* (2015.01)

(58) Field of Classification Search
CPC combination set(s) only.
See application file for complete search history.

(56) References Cited

U.S. PATENT DOCUMENTS 4,260,941 A * 4/1981 Engelberger .......... B23P 21/002
                                                    318/568.13
4,848,179 A * 7/1989 Ubhayakar ................ B25J 9/06
                                                    74/490.04
5,355,064 A * 10/1994 Yoshino ............... B62D 57/032
                                                    180/8.1

(Continued)

FOREIGN PATENT DOCUMENTS

JP             3-257506 A       11/1991

*Primary Examiner* — Jonathan L Sample
(74) *Attorney, Agent, or Firm* — Canon U.S.A., Inc. IP Division

(57) ABSTRACT

Feedback control is carried out on respective servomotors so that detection angles detected by respective input-side encoders become target angles to be obtained when a leading end of a robot has moved to a positioning completion position of a first motion. Subsequently, the position of the leading end of the robot is obtained on the basis of the detection angles detected by the respective output-side encoders. The time from a time point at which the detection angles detected by the input-side encoders are brought to the target angles through the feedback control to a time point at which a vibration width of the calculated position of the leading end of the robot relative to the positioning completion position converges within a convergence range is obtained. The obtained time is set in the stopping duration of the robot.

14 Claims, 10 Drawing Sheets

(56) References Cited

U.S. PATENT DOCUMENTS

| | | | | |
|---|---|---|---|---|
| 5,459,659 A * | 10/1995 | Takenaka | B62D 57/032 | 180/8.1 |
| 5,710,870 A * | 1/1998 | Ohm | B25J 3/04 | 700/245 |
| 6,408,224 B1 * | 6/2002 | Okamoto | B25J 9/1661 | 29/721 |
| 8,818,557 B2 * | 8/2014 | Velliste | A61B 5/04888 | 623/57 |
| 2005/0075755 A1 * | 4/2005 | Takenaka | B62D 57/032 | 700/245 |
| 2005/0204850 A1 * | 9/2005 | Nihei | B25J 9/102 | 74/490.01 |
| 2005/0278888 A1 * | 12/2005 | Reindle | A47L 9/2842 | 15/319 |
| 2006/0071625 A1 * | 4/2006 | Nakata | B25J 9/1633 | 318/568.12 |
| 2006/0293617 A1 * | 12/2006 | Einav | A61H 1/0274 | 601/33 |
| 2007/0016329 A1 * | 1/2007 | Herr | B62D 57/032 | 700/250 |
| 2007/0282228 A1 * | 12/2007 | Einav | A63B 21/4021 | 601/33 |
| 2009/0069942 A1 * | 3/2009 | Takahashi | B25J 9/1633 | 700/260 |
| 2011/0202308 A1 * | 8/2011 | Kishida | G01B 7/30 | 702/151 |
| 2011/0204838 A1 * | 8/2011 | Nakasugi | B25J 9/1633 | 318/689 |
| 2011/0231050 A1 * | 9/2011 | Goulding | B62D 57/024 | 701/26 |
| 2011/0301756 A1 * | 12/2011 | Yoshiike | B62D 57/032 | 700/253 |
| 2012/0048027 A1 * | 3/2012 | Hashiguchi | B25J 9/0087 | 73/763 |
| 2012/0215357 A1 * | 8/2012 | Igarashi | B25J 9/1641 | 700/258 |
| 2012/0259463 A1 * | 10/2012 | Orita | B25J 9/1648 | 700/245 |
| 2013/0270053 A1 * | 10/2013 | Orita | F16D 28/00 | 192/57 |
| 2013/0345877 A1 * | 12/2013 | Kose | B25J 9/1633 | 700/260 |
| 2014/0084840 A1 * | 3/2014 | Osaka | G05B 19/404 | 318/632 |
| 2014/0331807 A1 * | 11/2014 | Kitahara | B25J 9/042 | 74/490.03 |
| 2015/0165620 A1 * | 6/2015 | Osaka | B25J 13/088 | 700/250 |
| 2015/0251312 A1 * | 9/2015 | Suzuki | B25J 9/163 | 700/250 |

\* cited by examiner

ROBOT CONTROLLING METHOD, ROBOT APPARATUS, PROGRAM, RECORDING MEDIUM, AND METHOD FOR MANUFACTURING ASSEMBLY COMPONENT

BACKGROUND OF THE INVENTION

Field of the Invention

The present invention relates to robot controlling methods for controlling articulated robots, robot apparatuses, programs, recording media, and methods for manufacturing assembly components.

Description of the Related Art

Conventionally, various types of robot apparatuses are used in factories and so on, and nowadays, in order to carry out more complex operations than before, robot apparatuses that include multiaxial, articulated robots are widely used.

When an articulated robot is used as a production apparatus, the robot needs to operate at high speed in order to increase the work efficiency. Accordingly, it is necessary to determine, as soon as possible, that one motion has certainly completed, or in other words, that positioning has completed.

With respect to how the completion of positioning of a robot is to be determined, to date, a following technique has been proposed. For example, the position of the leading end of the robot is estimated on the basis of the position, the speed, and a torque instruction value of a servomotor, and if the estimated value falls within a range of permissible values of the leading end position set in advance, it is determined that positioning has completed (refer to Japanese Patent Laid-Open No. 3-257506).

However, according to the technique described in Japanese Patent Laid-Open No. 3-257506, the position of the leading end of the robot arm is estimated through a calculation on the basis of the value at an input side of a reduction gear, or in other words, on the basis of a detection angle detected by an encoder that detects the angle of rotation of a rotation shaft in a servomotor. In other words, what is detected is an angle at the input side of the reduction gear. The reduction gear that has low rigidity and is susceptible to vibration intervenes between the input side of the reduction gear and the leading end of the robot arm, and thus it is difficult to assure that the vibrations of the leading end have converged on the basis of the value at the input side of the reduction gear. Therefore, there is a case in which the vibrations of the leading end of the robot arm have actually not converged, and the precision of assembly work deteriorates in some cases.

In the meantime, it may be possible to simply stop a robot arm for a predetermined period of time before the robot arm moves to a subsequent motion, as described as a conventional technique in Japanese Patent Laid-Open No. 3-257506, but a stopping duration needs to be set with a considerable margin. Therefore, in a case in which the same assembly operation is carried out repeatedly, the excess time (margin) accumulates, and the work efficiency of the robot arm decreases.

The present invention is directed to increasing the work efficiency of an articulated robot by reducing an excess stopping duration.

SUMMARY OF THE INVENTION

A robot controlling method according to an aspect of the present invention is a robot controlling method for controlling an articulated robot. Joint driving devices configured to drive respective joints of the articulated robot each include a servomotor, a reduction gear, a motor-side angle detector configured to detect an output angle of the servomotor, and a reduction gear-side angle detector configured to detect an output angle of the reduction gear. The articulated robot is stopped for a stopping duration by a control unit before the articulated robot moves from a first motion to a second motion. The robot controlling method includes a feedback control step, a leading end position calculation step, a timing step, and a setting step. In the feedback control step, feedback control is carried out on the servomotors such that detection angles detected by the respective motor-side angle detectors become target angles. In the leading end position calculation step, a position of a leading end of the articulated robot is obtained based on detection angles detected by the respective reduction gear-side angle detectors. In the timing step, a time from a reference time point to a time point at which a vibration width, relative to a positioning completion position, of the position of the leading end of the articulated robot calculated in the leading end position calculation step converges within a convergence range is obtained. In the setting step, the time obtained in the timing step is set as the stopping duration.

According to an aspect of the present invention, the position of the leading end of the articulated robot is obtained on the basis of the detection angles detected by the reduction gear-side angle detectors, and the time in which the position of the leading end of the articulated robot converges at the positioning completion position is set in the stopping duration of the articulated robot. Through this configuration, the vibrations of the articulated robot converge when the articulated robot is stopped for the set stopping duration, and thus the work precision of the articulated robot improves. Furthermore, it is not necessary to provide a large margin in the stopping duration to be set, and thus the stopping duration can be shorter than that in an existing technique, and the work efficiency of the articulated robot improves.

Further features of the present invention will become apparent from the following description of exemplary embodiments with reference to the attached drawings.

DESCRIPTION OF THE EMBODIMENTS

Hereinafter, exemplary embodiments for implementing the present invention will be described in detail with reference to the drawings.

First Exemplary Embodiment

Figure 1:
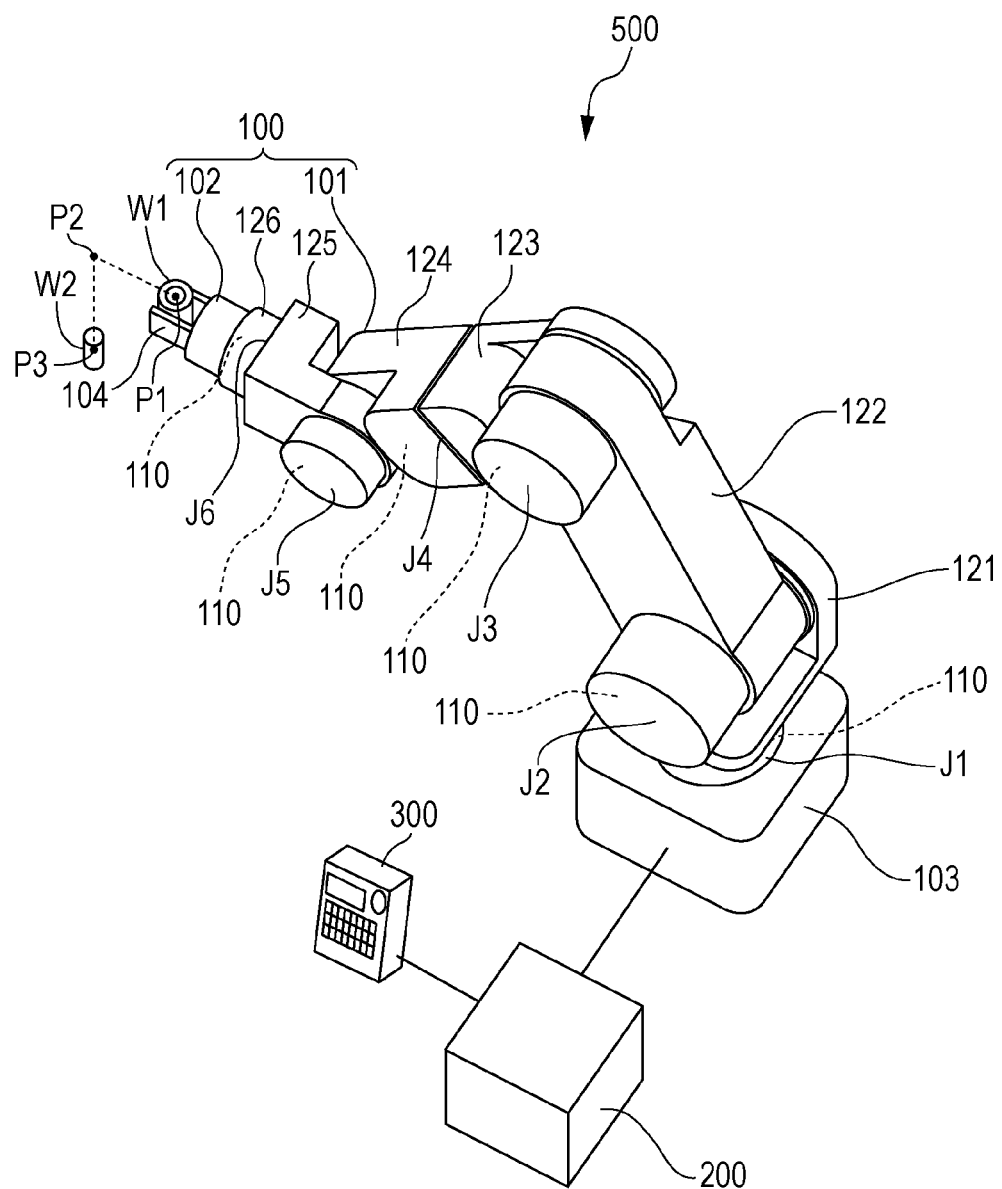
FIG. 1 is a perspective view illustrating a robot apparatus according to a first exemplary embodiment of the present invention.

Hereinafter, a robot apparatus according to an exemplary embodiment of the present invention will be described. FIG. 1 is a perspective view illustrating a robot apparatus according to a first exemplary embodiment of the present invention.

A robot apparatus 500 illustrated in FIG. 1 is an industrial robot. The robot apparatus 500 includes a robot 100, a control device 200, and a teaching pendant 300. The robot 100 carries out assembly work in which the robot 100 assembles a first part W1, which is held by the robot 100, and a second part W2. The control device 200, which serves as a control unit, controls the robot 100. The teaching pendant 300 is connected to the control device 200.

The robot 100, which is an articulated robot, includes a vertically articulated robot arm 101 and a robot hand 102, which is an end effector, connected to the leading end of the robot arm 101.

A tool center point (TCP) is set at a leading end of the robot 100 (the leading end of the robot hand 102 or of the robot arm 101), and in a case in which a teaching point is specified in a task space, the teaching point is expressed in parameters indicating the position and the posture of the TCP. In a case in which a teaching point is specified in a configuration space (joint space), the teaching point is expressed in parameters indicating the joint angles of respective joints in the robot 100. A teaching point specified in the configuration space can be converted into a teaching point in the task space through the forward kinematics computation, and a teaching point specified in the task space can be converted into a teaching point in the configuration space through the inverse kinematics computation.

The robot arm 101 includes a base portion (base end link) 103 that is fixed to a worktable and a plurality of links 121 through 126 that transmit displacement and force. The base portion 103 and the plurality of links 121 through 126 are coupled with one another through a plurality of joints J1 through J6 so as to be capable of gyrating or rotating. The robot arm 101 further includes joint driving devices 110 provided in the respective joints J1 through J6 for driving the joints J1 through J6. The joint driving devices 110 provided in the respective joints J1 through J6 are each constituted by a joint driving device with an appropriate output in accordance with the magnitude of necessary torque.

The robot hand 102 includes a plurality of holding claws (fingers) 104 that hold the first part W1, a driving unit (not illustrated) that drives the plurality of holding claws 104, an encoder (not illustrated) that detects the angle of rotation of the driving unit, and a mechanism (not illustrated) that converts the rotation into a holding motion. The mechanism that is not illustrated may be constituted by a cam mechanism, a link mechanism, or the like and is designed to suit necessary holding motions. The torque necessary for the driving unit used in the robot hand 102 differs from the torque for the joints in the robot arm 101, but the basic configurations are identical. In addition, the robot hand 102 includes a force torque sensor (not illustrated) that can detect the stress (reaction force) that acts on the holding claws 104 and so on.

The teaching pendant 300 can be connected to the control device 200 and, when connected to the control device 200, can transmit an instruction to the control device 200 to control the driving of the robot arm 101 or the robot hand 102.

Hereinafter, the joint driving device 110 in the joint J2 will be described as a representative example. The joint driving devices 110 in the remaining joints J1 and J3 through J6 may differ in size and performance, but their configurations are similar to the configuration of the joint J2, and thus descriptions thereof will be omitted.

Figure 2:
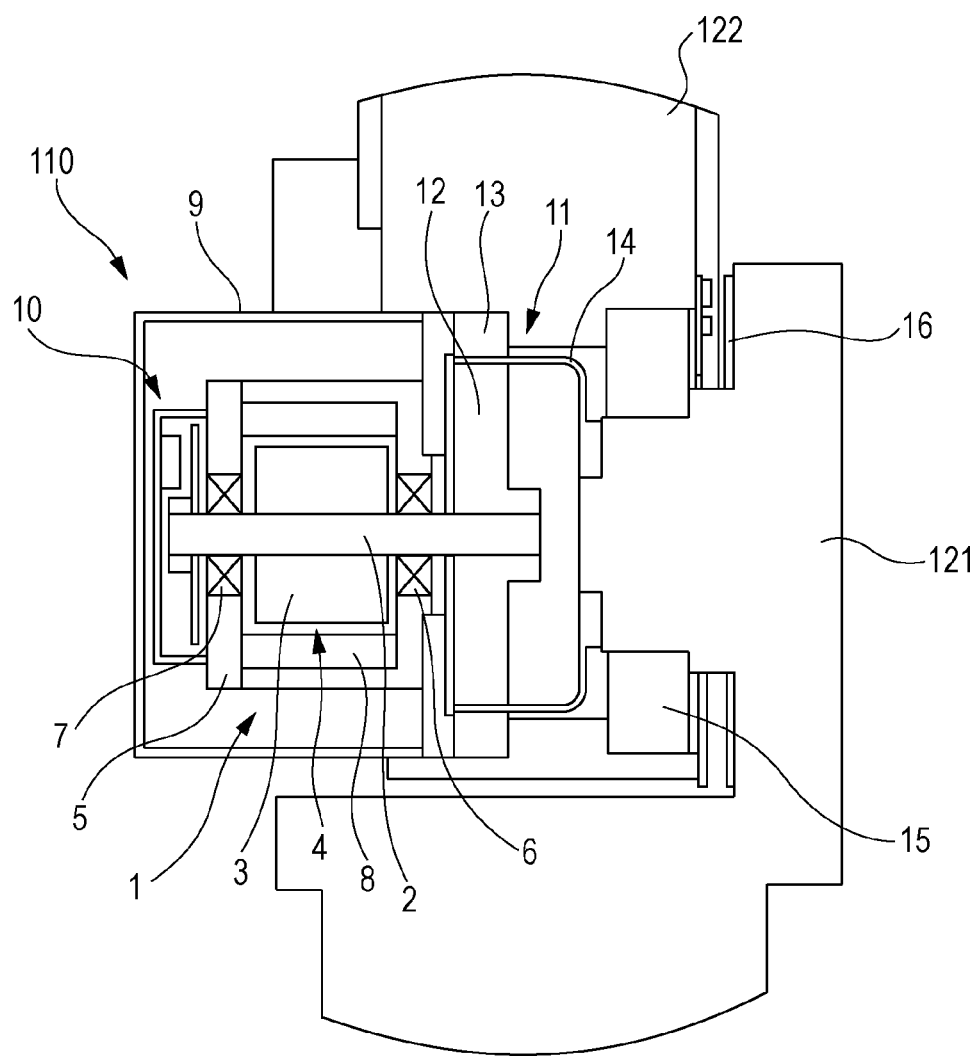
FIG. 2 is a fragmentary sectional view illustrating one of the joints in a robot arm of the robot apparatus according to the first exemplary embodiment of the present invention.

FIG. 2 is a fragmentary sectional view illustrating the joint J2 in the robot arm 101. The joint driving device 110 includes a servomotor (hereinafter, the motor) 1, which is an electric motor, and a reduction gear 11 that reduces the rotation speed of a rotation shaft 2 of the motor 1 and outputs the result.

The joint driving device 110 further includes an input-side encoder 10, which is a motor-side angle detector, that detects the angle of rotation (output angle) of the rotation shaft 2 of the motor 1. In addition, the joint driving device 110 includes an output-side encoder 16, which is a reduction gear-side angle detector, that detects the angle of rotation (output angle) of an output shaft of the reduction gear 11.

The motor 1, for example, is a brushless DC servomotor or an AC servomotor. The motor 1 includes a rotation unit 4 that is constituted by the rotation shaft 2 and a rotor magnet 3, a motor housing 5, bearings 6 and 7 that support the rotation shaft 2 such that the rotation shaft 2 can freely rotate, and a stator coil 8 that rotates the rotation unit 4. The bearings 6 and 7 are provided in the motor housing 5, and the stator coil 8 is attached to the motor housing 5. In addition, the servomotor 1 is covered by a motor cover 9.

The input-side encoder 10 is an optical or magnetic rotary encoder and is provided at one end of the rotation shaft 2 of the motor 1. The input-side encoder 10 generates a pulse signal in accordance with the rotation of the rotation shaft 2 of the motor 1 and outputs the generated pulse signal to the control device 200. Although the input-side encoder 10 is attached to the rotation shaft 2, the input-side encoder 10 may instead be attached to an input shaft of the reduction gear 11.

The output-side encoder 16 is an optical or magnetic rotary encoder and detects the output angle of the reduction gear 11. In the first exemplary embodiment, the output-side encoder 16 detects the angle formed by the base portion 103 and the link 121 or the angle formed by any two adjacent links. In the joint 2, the output-side encoder 16 detects the angle formed by the link 121 and the link 122. Specifically, the output-side encoder 16 generates a pulse signal in accordance with the driving of the joint J2 (movement of the link 121 and/or the link 122 relative to each other) and outputs the generated pulse signal to the control device 200.

The link 121 and the link 122 are coupled to each other through a cross roller bearing 15 so as to be capable of freely rotating. A brake unit may be provided, as necessary, between the motor 1 and the input-side encoder 10 so as to retain the posture of the robot arm 101 when the power supply is turned off.

In the first exemplary embodiment, the reduction gear 11 is a strain wave reduction gear that is small and lightweight and has a large reduction gear ratio. The reduction gear 11 includes a wave generator 12 that is coupled to the rotation shaft 2 of the motor 1 and that includes an input shaft, and a circular spline 13 that is fixed to the link 122 and that includes an output shaft. Although the circular spline 13 is coupled directly to the link 122, the circular spline 13 and the link 122 may be integrated into a single unit.

The reduction gear 11 further includes a flexspline 14 that is provided between the wave generator 12 and the circular spline 13 and that is fixed to the link 121. The flexspline 14 has its speed reduced at a reduction gear ratio N relative to the rotation of the wave generator 12 and rotates relative to the circular spline 13. Therefore, the number of rotations of the rotation shaft 2 of the motor 1 is reduced to 1/N by the reduction gear 11, and the joint J2 is bent (rotated) by rotating the link 122, to which the circular spline 13 is fixed, relative to the link 121, to which the flexspline 14 is fixed. The angle of rotation at the output side of the reduction gear 11 obtained at this point serves as an actual output angle, or in other words, the angle (joint angle) of the joint J2.

Figure 3:
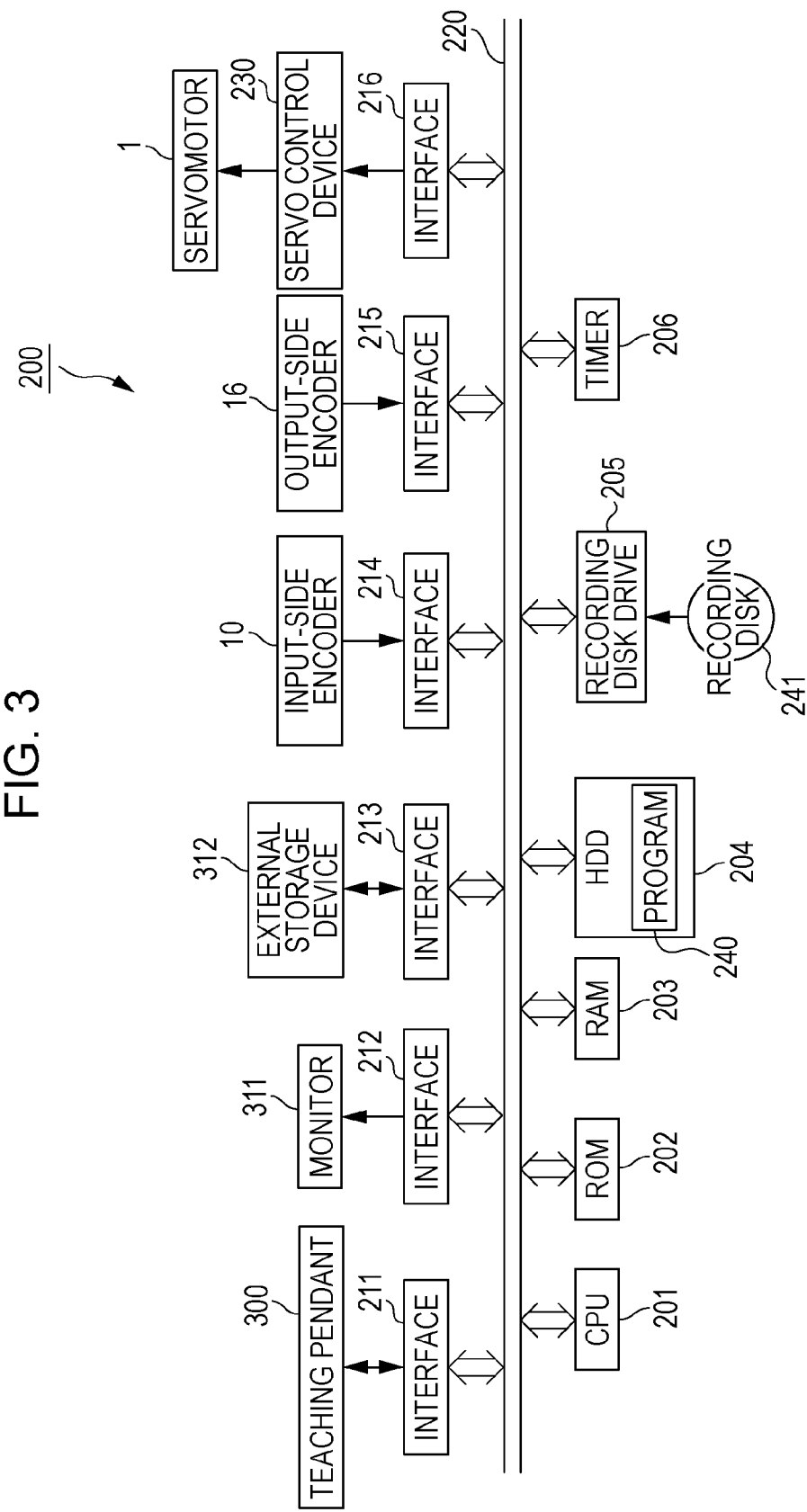
FIG. 3 is a block diagram illustrating a configuration of a control device in the robot apparatus according to the first exemplary embodiment of the present invention.

FIG. 3 is a block diagram illustrating the configuration of the control device 200 of the robot apparatus 500. The control device 200 serving as the control unit includes a central processing unit (CPU) 201 serving as a controller (arithmetic unit). The control device 200 further includes a read-only memory (ROM) 202, a random-access memory (RAM) 203, and a hard disk drive (HDD) 204, which serve as a storage unit. In addition, the control device 200 includes a recording disk drive 205, a timing unit (timer) 206, and various interfaces 211 through 216. The control device 200 further includes a servo control device 230 that is connected to the interface 216.

The ROM 202, the RAM 203, the HDD 204, the recording disk drive 205, the timer 206, and the interfaces 211 through 216 are connected to the CPU 201 through a bus 220. The ROM 202 stores a basic program, such as a BIOS. The RAM 203 is a storage device that temporarily stores various pieces of data, such as an arithmetic processing result of the CPU 201.

The HDD 204 is a storage device that stores an arithmetic processing result of the CPU 201 and various pieces of data obtained from an external unit and also records a program 240 that causes the CPU 201 to execute various arithmetic processes, which will be described later. The CPU 201 executes each of the steps in a robot controlling method in accordance with the program 240 recorded (stored) in the HDD 204.

The recording disk drive 205 can read out various pieces of data and a program recorded in a recording disk 241. The timer 206 counts the time in accordance with an instruction from the CPU 201 to start counting the time and an instruction to stop counting the time, and outputs the counted time to the CPU 201.

The interface 211 is connected to the teaching pendant 300 that can be operated by a user. The teaching pendant 300 outputs data of an inputted teaching point (target angles of the respective joints J1 through J6 in a case in which the teaching point has been specified in the configuration space) to the CPU 201 through the interface 211 and the bus 220. The CPU 201 sets the data of the teaching point inputted from the teaching pendant 300 in a storage unit, such as the HDD 204.

The interface 212 is connected to a monitor 311 on which various types of images are displayed, and the interface 213 is connected to an external storage device 312 constituted, for example, by a rewritable, non-volatile memory or an external HDD.

The interface 214 is connected to the input-side encoder 10, and the interface 215 is connected to the output-side encoder 16. The input-side encoder 10 and the output-side encoder 216 output the above-described pulse signals to the CPU 201 through the respective interfaces 214 and 215 and the bus 220.

The interface 216 is connected to the servo control device 230. The CPU 201 generates a trajectory connecting teaching points and outputs, at predetermined intervals, data of a driving instruction indicating the amount by which the angle of rotation of the rotation shaft 2 of the servomotor 1 is to be controlled to the servo control device 230 through the bus 220 and the interface 216.

The servo control device 230 calculates the amount of an electric current to be outputted to the servomotor 1 in feedback control on the basis of the driving instruction inputted from the CPU 201, and supplies an electric current to the servomotor 1 so as to control the joint angles of the joints J1 through J6 in the robot arm 101. In other words, the CPU 201 controls the driving of the joints J1 through J6 by the servomotor 1 through the servo control device 230 so that the angles of the joints J1 through J6 reach the target angles.

Figure 4:
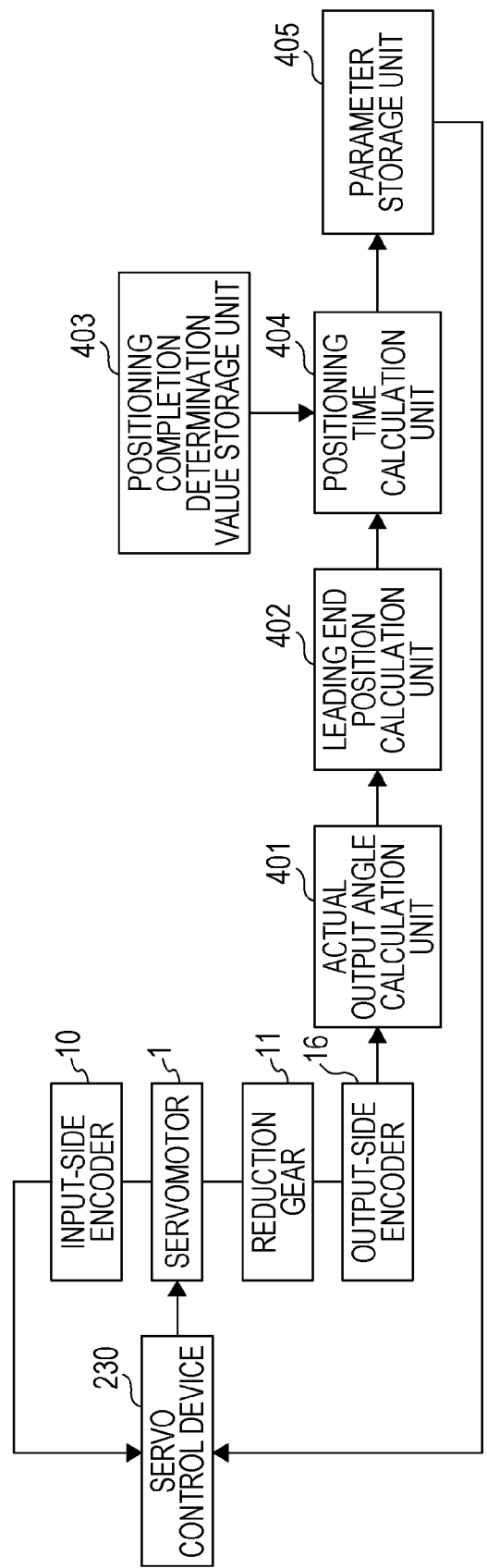
FIG. 4 is a functional block diagram illustrating a control system of the robot apparatus according to the first exemplary embodiment of the present invention.

Now, with reference to FIG. 4, the functions of the CPU 201 and the HDD 204 performed when a positioning completion detection program, which will be described later, is executed. FIG. 4 is functional block diagram illustrating a control system of the robot apparatus 500 according to the first exemplary embodiment of the present invention. Upon executing the program 240, the CPU 201 illustrated in FIG. 3 functions as an actual output angle calculation unit 401, a leading end position calculation unit 402, and a positioning time calculation unit 404 illustrated in FIG. 4. In addition, the HDD 204 serving as the storage unit functions as a positioning completion determination value storage unit 403 and a parameter storage unit 405. Hereinafter, each of the units will be described.

The actual output angle calculation unit 401 receives an input of a pulse signal from the output-side encoder 16 and calculates an output angle (detection angle) θ. The output angle θ is a value that includes the deflection of the reduction gear 11, which makes it possible to obtain information on a position that is closer to the leading end of the robot arm 101, as compared with a method in which the angle of rotation at the output side is calculated through the input-side encoder 10.

The leading end position calculation unit 402 calculates the position of the leading end (TCP) of the robot 100 through the forward kinematics on the basis of the value obtained by the actual output angle calculation unit 401, or in other words, the detection angles, detected by the respective output-side encoders 16, that can be regarded as the joint angles of the respective joints J1 through J6.

The positioning completion determination value storage unit 403 stores a positioning completion determination value that is used to determine whether positioning of the leading end of the robot 100 has completed and that determines the permissible range (convergence range) of the leading end position. It is preferable that the user store this determination value in advance in the positioning completion determination value storage unit 403. The determination value is preferably set for each of the axial directions of coordinates x, y, and z in the orthogonal coordinate system (world coordinate system) in accordance with the operation state of the robot arm 101. In other words, when the position of the leading end of the robot 100 is expressed in the orthogonal coordinate system, the convergence range may be set individually in each axial direction of the orthogonal coordinate system.

In a case in which the correspondence relationship between the leading end position and each joint angle is known, feedback control may be carried out so that the joint angles reach the target angles.

For example, if a small determination value is set only in a direction in which high operation precision is required, an optimal positioning completion determination time can be obtained. The determination value may be derived from a prior experiment or drawings by the user. Alternatively, more simply, prescribed values at several levels corresponding to usage conditions may be prepared, and a value may be selected from the prepared values and applied.

The positioning time calculation unit 404 obtains the positioning time of a target motion of the robot 100 (duration in which the robot 100 is being stopped) on the basis of the value obtained by the leading end position calculation unit 402 and the value obtained from the positioning completion determination value storage unit 403.

The parameter storage unit 405 stores the value obtained by the positioning time calculation unit 404. The stored value is applied as a positioning completion time (stopping duration) of a given target motion through the servo control device 230 when the robot apparatus 500 is put to a continuous operation.

Now, a case in which an assembly component is manufactured by moving the leading end (TCP) of the robot 100 sequentially through teaching points P1, P2, and P3 so as to assemble the part W1 and the part W2, as illustrated in FIG. 1, will be described. In FIG. 1, a motion in which the leading end moves from the teaching point P1 to the teaching point P2 is referred to as a first motion, and a motion in which the leading end moves from the teaching point P2 to the teaching point P3 is referred to as a second motion. Before the robot 100 transitions from the first motion to the second motion, the control device 200 temporarily stops the robot 100 for a certain stopping duration at the position of the teaching point P2 in order to allow the vibrations of the robot 100 to converge.

In other words, the control device 200 carries out feedback control so that, in the first motion, the detection angles detected by the respective input-side encoders 10 lead to the teaching point P2 (i.e., the target angles of the respective joints J1 through J6) specified in the configuration space. The control device 200 carries out the feedback control on the basis of the result of detection by the input-side encoders 10, and thus the leading end of the robot 100 reaches the teaching point P2 more quickly than in a case in which feedback control is carried out on the basis of the result of detection by the output-side encoders 16. However, the robot 100 is affected by the force of inertia associated with the first motion, and the robot 100 vibrates due to the deflection or the like of the reduction gear 11 upon reaching the teaching point P2. It is difficult to accurately obtain the vibrations caused by the reduction gear 11 on the basis of the angle of the motor 1 (detection angles detected by the input-side encoders 10). If the second motion or a motion of manufacturing the assembly component by assembling the part W1 and the part W2 is carried out in a state in which the vibrations of the robot 100 have not converged, the assembly may fail. Accordingly, in the first exemplary embodiment, the robot 100 is stopped for the stopping duration set in advance from the time point at which the robot 100 has completed the first motion and has reached the teaching point P2, and is then caused to carry out the second motion. The data of this stopping duration is stored in the positioning time calculation unit 404 described above.

Figure 5:
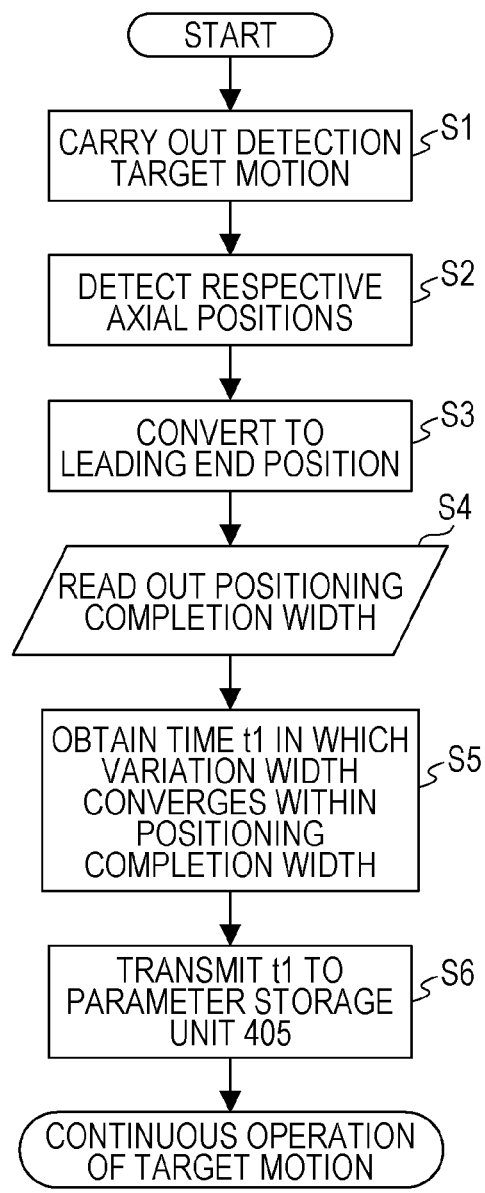
FIG. 5 is a flowchart illustrating each of the steps in a robot controlling method implemented by the control device according to the first exemplary embodiment of the present invention.

Hereinafter, the operation for setting this stopping duration will be described. FIG. 5 is a flowchart illustrating each of the steps in a robot controlling method to be implemented by the control device 200 according to the first exemplary embodiment of the present invention.

First, the servo control device 230 carries out a detection target motion in accordance with an instruction from the CPU 201 (S1: feedback control step). The servo control device 230 feeds back the position information from the input-side encoders 10 so as to carry out the control in accordance with the instruction from the CPU 201. To be more specific, under the control of the CPU 201, the servo control device 230 carries out the feedback control on the respective servomotors 1 so that the detection angles detected by the respective input-side encoders 10 become the target angles to be obtained when the leading end of the robot 100 has moved to the positioning completion position of the first motion. The positioning completion position of the first motion is indicated by the position coordinates x, y, and z of the teaching point P2 and is also referred to as the target position, hereinafter.

Subsequently, the actual output angle calculation unit 401 starts the timer 206 to time the duration from the time point at which the detection angles of the respective joints J1 through J6 detected by the input-side encoders 10 in step S1 are brought to the target angles and obtains the detection angles of the respective joints J1 through J6 detected by the output-side encoders 16 at given time intervals. Then, the actual output angle calculation unit 401 calculates the angles of rotation of the output shafts of the reduction gears 11 in the respective joints J1 through J6 at the given time intervals, on the basis of pulse signals from the output-side encoders 16 (S2). In other words, the actual output angle calculation unit 401 obtains the detection angles detected by the respective output-side encoders 16. A configuration in which a timing step starts with the time at which the detection angles detected by the input-side encoders 10 have brought to the target angles being set as a reference time point T0 is described herein, but the user may set any desired reference time point. In other words, in setting the stopping duration as described hereinafter, it is necessary that an appropriate reference time point T0 be set.

Subsequently, the leading end position calculation unit 402 obtains the position of the leading end of the robot 100 (position of TCP) on the basis of the angles of rotation of the output shafts of the reduction gears 11 in the respective joints obtained in step S2 (S3: leading end position calculation step). The leading end position can be obtained by converting the angles of rotation of the respective joints through the forward kinematics. In other words, the leading end position calculation unit 402 obtains the position of the leading end of the robot 100 on the basis of the detection angles detected by the respective output-side encoders 16.

Figure 6:
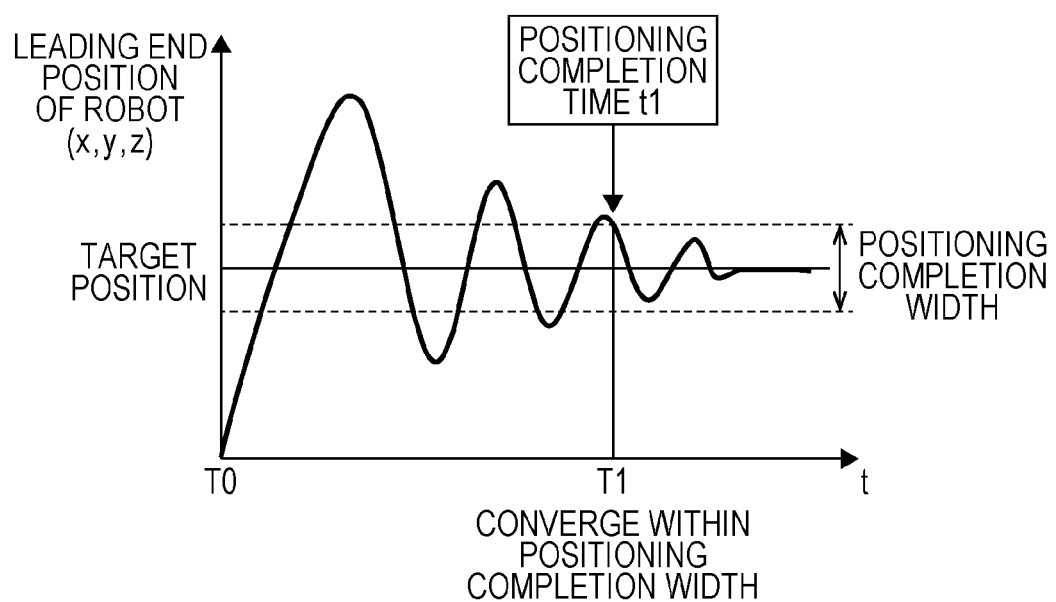
FIG. 6 is a graph illustrating the state of vibrations of the leading end of the robot according to the first exemplary embodiment of the present invention.

FIG. 6 is a graph illustrating the state of vibrations of the leading end of the robot. The horizontal axis represents the time t, and the vertical axis represents the leading end position of the robot in one of the three directions along the x-, y-, and z-coordinates. Through step S3, data, as illustrated in FIG. 6, of the position of the leading end of the robot undergoing damped vibrations is created at the given time intervals.

Subsequently, the positioning time calculation unit 404 reads out the positioning completion determination value from the positioning completion determination value storage unit 403 (S4). Then, the positioning time calculation unit 404 distributes the value in the positive and negative directions with the central value being set at the target position in each of the coordinates x, y, and z that the detection target motion is to reach, as illustrated in FIG. 6, and thus sets a positioning completion width (convergence range).

Subsequently, the positioning time calculation unit 404 obtains a time t1 in which the vibrations fall within the positioning completion width (within the convergence range) relative to the target position, on the basis of the vibration data of the leading end of the robot 100, as illustrated in FIG. 6 (S5: timing step). As illustrated in FIG. 6, the time point at which the detection angles detected by the respective input-side encoders 10 are brought to the target angles (teaching point P2) in step S1 is set as the time T0. In addition, as illustrated in FIG. 6, the time point at which the vibration width relative to the positioning completion position of the position of the leading end of the robot 100 calculated in step S3 has converged within the convergence range is set as a time T1. The positioning time calculation unit 404 obtains the time t1 that is from the time T0 to the time T1. In other words, in step S5, the time t1 in which the leading end position obtained in step S3 converges within the positioning completion width read out and set in step S4.

Subsequently, the positioning time calculation unit 404 transmits the time t1 obtained in step S5 to the parameter storage unit 405 to store the time t1 therein and thus sets the stopping duration (positioning completion time) of the robot 100 (S6: setting step).

After steps S1 through S6 described above have been carried out and the stopping duration has been set, the process moves to a step of manufacturing the assembly component (continuous operation). Specifically, the robot 100 is caused to hold the first part W1 and to carry out the first motion and is then stopped for the stopping duration set in advance. Thereafter, the robot 100 assembles the first part W1 and the second part W2 through the second motion so as to manufacture the assembly component.

The processes in steps S1 through S6 described above may be carried out at the time of an actual continuous operation (at the time of assembly work) or may be carried out prior to a continuous operation, separately from the continuous operation, at the time of a trial operation in which an operation similar to the operation carried out at the time of a continuous operation is carried out. In the case of the continuous operation, the robot 100 may be controlled on the basis of the set stopping duration starting from the time of assembling a lot following another lot for which the stopping duration has been set.

In the case of the trial operation, the robot hand 102 of the robot 100 may hold the actual part W1 or a jig corresponding to the part W1, and the processes in steps S1 through S6 described above may be carried out. Thus, the stopping duration of the robot 100 in a case in which the robot hand 102 has been moved to the teaching point P2 may be set. Then, the robot 100 may be controlled at the time of a continuous operation in accordance with the set stopping duration.

In this manner, when the robot arm 101 is operated through a teaching playback system, the motion trajectory has reproducibility. When such a property is utilized, the time in which the vibrations converge within the positioning completion width in a subsequent operation and thereafter stays substantially the same. Accordingly, this time can be regarded as the positioning completion time of the detection target motion.

As described thus far, with the robot apparatus 500 according to the first exemplary embodiment, the position of the leading end of the robot 100 is calculated on the basis of the detection angles detected by the output-side encoders 16, and thus the time t1 in which the vibrations of the leading end converge can be obtained with accuracy.

In addition, the operation reproducibility of the teaching playback system is utilized, and thus the time it takes to determine that positioning has completed can be reduced. Therefore, as compared with a method that is based on a value at an input side of a reduction gear as in an existing technique, the condition for completing positioning as quickly as possible with the precision being assured can be obtained with accuracy.

In other words, when the robot 100 is moved from the teaching point P1, which is the starting point of the first motion, to the teaching point P2, which is the ending point, the robot 100 is stopped for the stopping duration set in t1, and thus the vibrations of the leading end of the robot 100 converge. Therefore, the operation of the robot 100 moving from the teaching point P2, which is the starting point of the second motion, to the teaching point P3, which is the ending point of the second motion, stabilizes. Accordingly, when the assembly work in which the part W1 and the part W2 are assembled is carried out, the precision of the assembly work can be prevented from deteriorating. In this manner, the vibrations of the robot 100 converge as the robot 100 is stopped for the set stopping duration, and thus the work precision of the robot 100 improves.

Furthermore, it is not necessary to provide a large margin in the stopping duration to be set, and thus the stopping duration can be shorter than that in an existing technique, and the work efficiency of the robot 100 improves.

In addition, the convergence range is set individually in each of the axial directions along the coordinates x, y, and z, and the convergence range in a direction in which the operation precision is not required is set large. Thus, the time it takes to complete positioning (the time it takes for the vibrations to converge, i.e., the stopping duration of the robot 100) can be reduced. Accordingly, the robot 100 becomes capable of a faster operation than before.

Second Exemplary Embodiment

Figure 7:
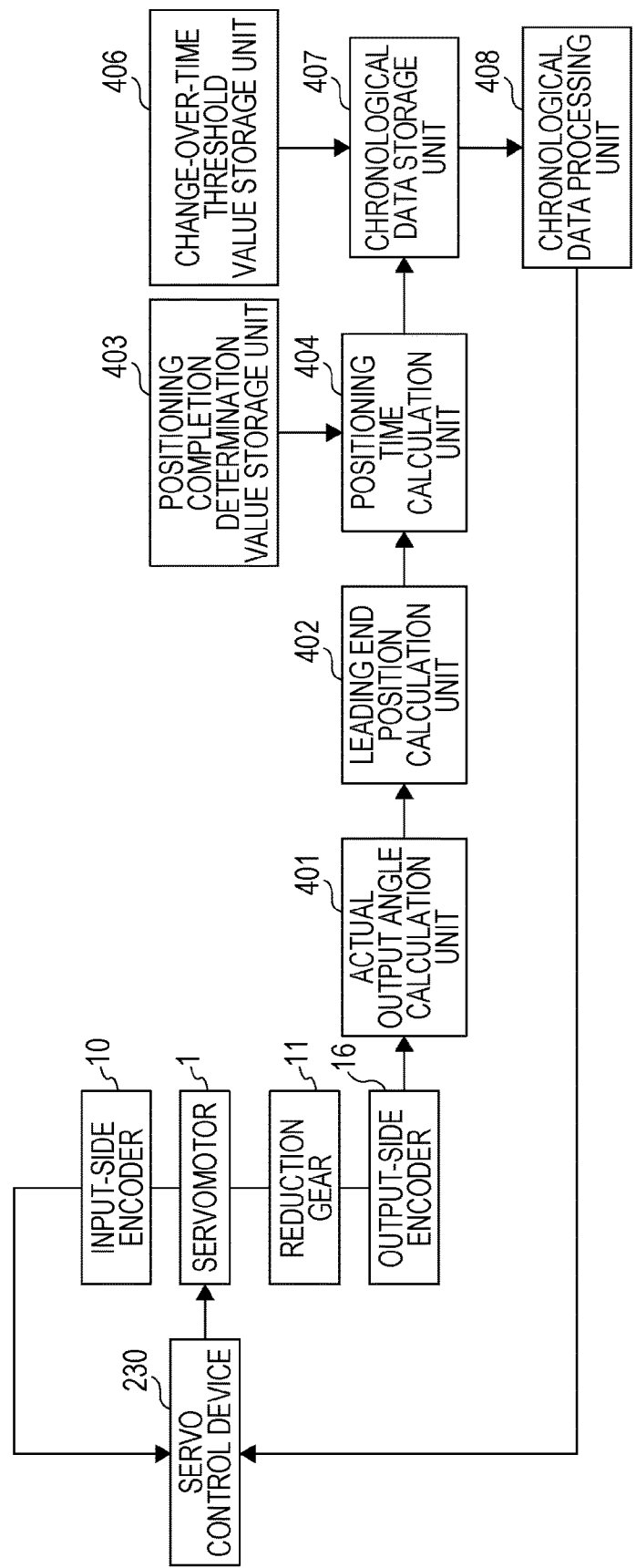
FIG. 7 is a functional block diagram illustrating a control system of a robot apparatus according to a second exemplary embodiment of the present invention.
Figure 8:
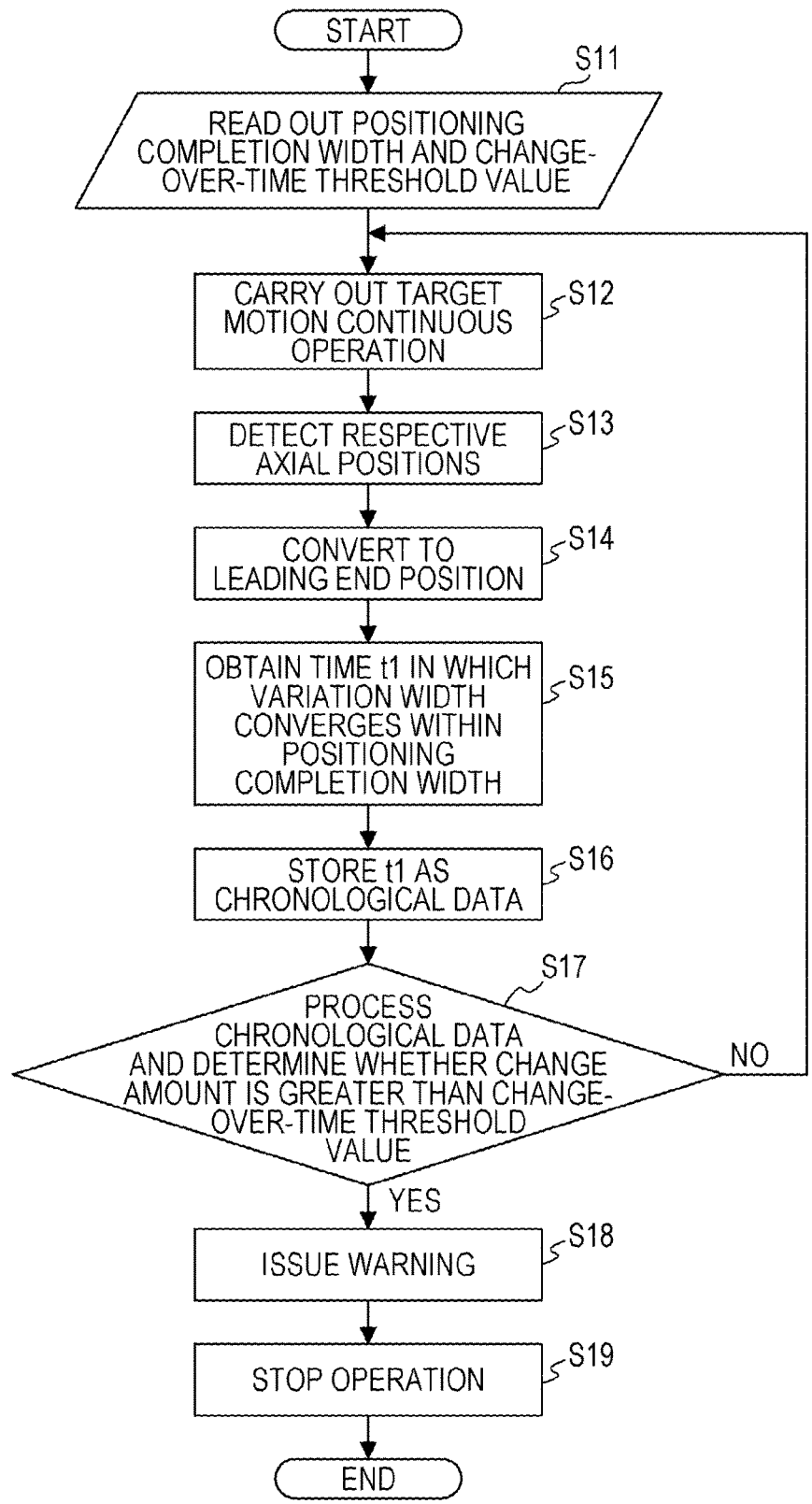
FIG. 8 is a flowchart illustrating each of the steps in a robot controlling method implemented by a control device according to the second exemplary embodiment of the present invention.

Subsequently, a robot controlling method for a robot apparatus according to a second exemplary embodiment of the present invention will be described with reference to FIGS. 7 and 8. FIG. 7 is a functional block diagram illustrating a control system of the robot apparatus according to the second exemplary embodiment of the present invention. FIG. 8 is a flowchart illustrating each of the steps in the robot controlling method implemented by a control device according to the second exemplary embodiment of the present invention. It is to be noted that the overall configuration of the robot apparatus according to the second exemplary embodiment is similar to the configuration of the robot apparatus 500 according to the first exemplary embodiment; thus, descriptions thereof will be omitted and the following description centers on points that differ from those of the first exemplary embodiment. The second exemplary embodiment differs from the first exemplary embodiment in terms of the functionality of the control device 200, or in other words, the content of the program 240 (refer to FIG. 3).

When the robot arm 101 is used for an extended period of time, an influence of a change over time in components, such as the reduction gear 11 and a timing belt (not illustrated), constituting the robot arm 101 is observed. In this case, it is conceivable that the time in which vibrations converge changes from the stopping duration (positioning completion time) of the robot 100 set in advance. If the stopping duration of the robot 100 is used as in its initial setting and a change in the positioning completion time occurs over time, the robot 100 may move to the second motion while the operation precision has not been secured. Hereinafter, in the second exemplary embodiment, a method for addressing a change in the positioning completion time will be described.

Hereinafter, although the units illustrated in FIG. 7 will be described, the descriptions of the units that are common to those illustrated in FIG. 4 used to describe the first exemplary embodiment will be omitted. Upon executing the program 240, the CPU 201 illustrated in FIG. 3 functions as the actual output angle calculation unit 401, the leading end position calculation unit 402, the positioning time calculation unit 404, and a chronological data processing unit 408 illustrated in FIG. 7. In addition, the HDD 204 serving as the storage unit functions as the positioning completion determination value storage unit 403, a change-over-time threshold value storage unit 406, and a chronological data storage unit 407.

The change-over-time threshold value storage unit 406 stores a threshold value of a discrepancy between the time t1, calculated by the positioning time calculation unit 404, in which the vibrations of the robot 100 converge and the positioning completion time that is currently applied for determining that a change in the positioning completion time has occurred over time. It is preferable that this threshold value be set to be small if the content of work is precise. The user sets the threshold value in advance in the change-over-time threshold value storage unit 406.

The chronological data storage unit 407 stores the obtained positioning completion time in chronological order for determining whether a change in the positioning completion time has occurred over time. The method for obtaining the positioning completion time is the same as the method described in the first exemplary embodiment.

The chronological data processing unit 408 processes chronological data of the positioning completion time stored in the chronological data storage unit 407 so as to determine whether a change in the positioning completion time has occurred over time. The chronological data may be processed, for example, through the method of moving averages. In a case in which a change has been detected, a stop instruction is transmitted to the servo control device 230.

Subsequently, with reference to the flowchart illustrated in FIG. 8, a control operation of the control device 200 will be described. Prior to a continuous operation, the positioning time calculation unit 404 and the chronological data processing unit 408 read out the positioning completion determination value and the threshold value for determining a change over time from the positioning completion determination value storage unit 403 and the change-over-time threshold value storage unit 406, respectively (S11).

The servo control device 230 carries out a target motion in the continuous operation in accordance with an instruction from the CPU 201 (S12: feedback control step). To be more specific, under the control of the CPU 201, the servo control device 230 carries out the feedback control on the servomotors 1 so that the detection angles detected by the respective input-side encoders 10 become the target angles to be obtained when the leading end of the robot 100 has moved to the positioning completion position of the first motion.

Subsequently, the actual output angle calculation unit 401 starts the timer 206 to time the duration from the time point at which the detection angles of the respective joints J1 through J6 detected by the input-side encoders 10 in step S12 are brought to the target angles, and obtains the detection angles of the respective joints J1 through J6 detected by the output-side encoders 16 at given time intervals. Then, the actual output angle calculation unit 401 calculates the angles of rotation of the output shafts of the reduction gears 11 in the respective joints J1 through J6 at the given time intervals, on the basis of pulse signals from the output-side encoders 16 (S13). In other words, the actual output angle calculation unit 401 obtains the detection angles detected by the respective output-side encoders 16.

Subsequently, the leading end position calculation unit 402 obtains the position of the leading end of the robot 100 (position of TCP) on the basis of the angles of rotation of the output shafts of the reduction gears 11 in the respective joints obtained in step S13 (S14: leading end position calculation step). This leading end position is obtained by converting the angles of rotation of the respective joints through the forward kinematics. In other words, the leading end position calculation unit 402 obtains the position of the leading end of the robot 100 on the basis of the detection angles detected by the respective output-side encoders 16.

Subsequently, the positioning time calculation unit 404 obtains the time t1 in which the vibrations fall within the positioning completion width (within the convergence range) relative to the target position, on the basis of the vibration data of the leading end of the robot 100 (S15: timing step).

The processes in steps S12 to S15 described above are similar to the processes in steps S1 to S5 of FIG. 5 described in the first exemplary embodiment. In other words, the processes in step S1 through S5 of FIG. 5 are carried out again.

Subsequently, the positioning time calculation unit 404 stores the time t1 obtained in step S15 in the chronological data storage unit 407 (S16).

At this point, if the time t1 obtained in step S15 has changed from the stopping duration stored in the parameter storage unit 405 (refer to FIG. 4), the positioning time calculation unit 404 updates the stopping duration stored in the parameter storage unit 405 to the time t1 obtained in step S15. It is to be noted that, if the time t1 obtained in S15 has changed by a predetermined period of time or more from the stopping duration stored in the parameter storage unit 405, the positioning time calculation unit 404 may update the stopping duration stored in the parameter storage unit 405 to the time t1 obtained in step S15.

In either case, in a case in which the time it takes for the vibrations to converge has changed due to a change in components of the robot 100 over time, the convergence time after the change can be applied to the stopping duration, and the operation can be continued. Therefore, while the operation of the robot 100 is continued, the state in which the operation precision of the robot 100 is secured can be retained.

In the second exemplary embodiment, the time (positioning completion time) t1 stored in the chronological data storage unit 407 in step S16 is used only to check for a change over time and is not used to determine whether positioning has completed. The time t1 tends to increase along with a change in the robot 100 over time, and comparing the time t1 against the threshold value makes it possible to determine whether the robot 100 has deteriorated over time. In other words, if the time t1 is equal to or greater than the threshold value, it is found that a component (in particular, the reduction gear 11 or a timing belt) constituting the robot 100 has deteriorated.

The chronological data processing unit 408 processes the chronological data of the positioning completion time t1 stored in the chronological data storage unit 407 in step S16, and calculates the amount of change in the positioning completion time. The chronological data processing unit 408 determines whether the obtained amount of change in the positioning completion time caused by a change in the robot 100 over time is equal to or greater than the threshold value read out in advance in step S11 (S17). If the amount of change is less than the threshold value (S17: No), the operation returns to step S12 and the processes in and after step S12 are repeated.

If the amount of change is equal to or greater than the threshold value (S17: Yes), the chronological data processing unit 408 issues a warning to notify the user to that effect (S18: notification step), and stops the operation of the robot 100 (S19). With respect to a method for issuing the warning, it is preferable that the warning be displayed in the teaching pendant 300 or the monitor 311. The robot 100 is stopped when the positioning completion time has changed due to a change in components of the robot 100 (in particular, the joints J1 through J6), and the warning is issued to the user. Thus, the robot 100 can be prevented from moving to a subsequent operation when the precision is not secured.

It is to be noted that the processes illustrated in FIG. 8 do not need to be carried out each time during a continuous operation of a target motion, and may be carried out in every several instances of continuous operations with the performance and calculation load of the CPU 201 taken into consideration.

Third Exemplary Embodiment

Figure 9:
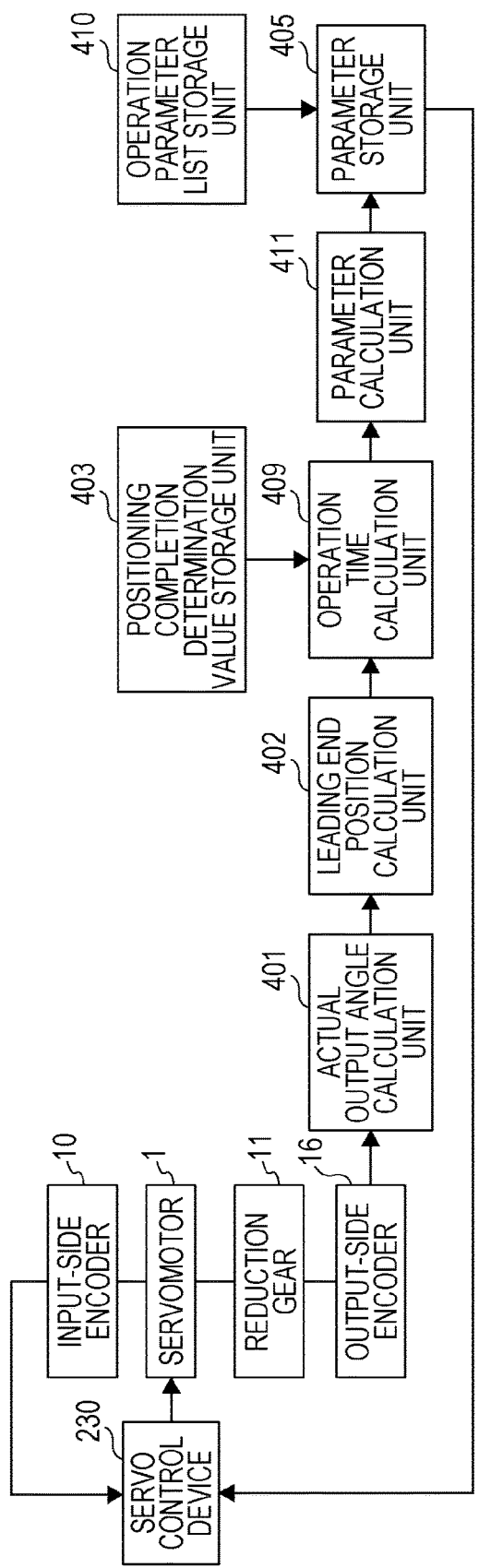
FIG. 9 is a functional block diagram illustrating a control system of a robot apparatus according to a third exemplary embodiment of the present invention.
Figure 10:
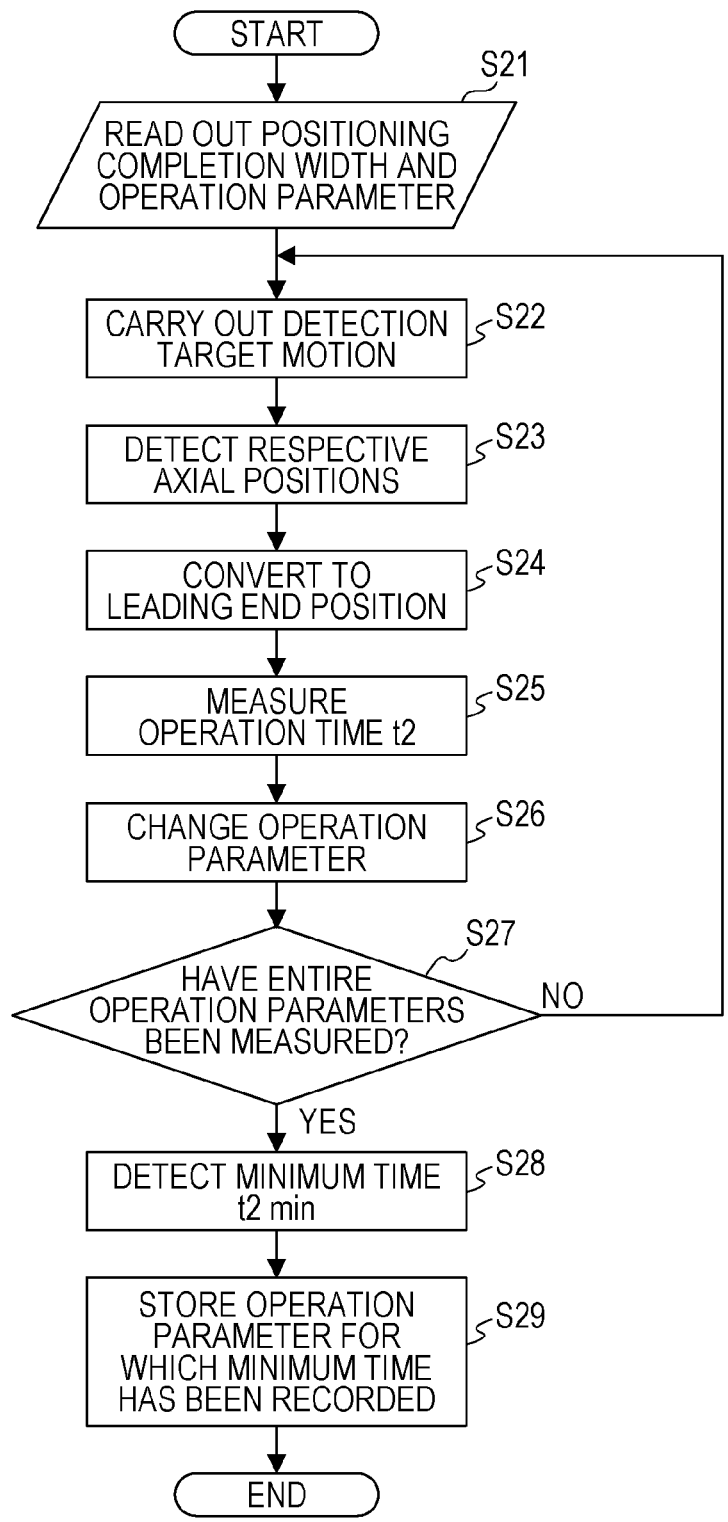
FIG. 10 is a flowchart illustrating each of the steps in a robot controlling method implemented by a control device according to the third exemplary embodiment of the present invention.

Subsequently, a robot controlling method for a robot apparatus according to a third exemplary embodiment of the present invention will be described with reference to FIGS. 9 and 10. FIG. 9 is a functional block diagram illustrating a control system of the robot apparatus according to the third exemplary embodiment of the present invention. FIG. 10 is a flowchart illustrating each of the steps in the robot controlling method implemented by a control device according to the third exemplary embodiment of the present invention. It is to be noted that the overall configuration of the robot apparatus according to the third exemplary embodiment is similar to the configuration of the robot apparatus 500 according to the first exemplary embodiment; thus, descriptions thereof will be omitted and the following description centers on points that differ from those of the first exemplary embodiment. The third exemplary embodiment differs from the first exemplary embodiment in terms of the functionality of the control device 200, or in other words, the content of the program 240 (refer to FIG. 3).

When the speed of the first motion is increased in order to increase the operation efficiency of the robot apparatus, the vibrations at the positioning completion position increase. In this case, the time it takes for the vibrations to converge within the necessary precision range becomes longer. In other words, the time that can be saved by increasing the speed of the first motion is in a reciprocal relationship with the waiting time for the vibrations to cease at the positioning completion position. However, in a case in which the speed of the first motion at which the operation efficiency of the robot is optimized is to be obtained, the time from when the first motion is started to when positioning completes needs to be measured repeatedly while changing the speed, and the load of the operator handling the robot increases. In particular, it is often the case that measuring instruments for a robot installed within a production apparatus are difficult to install due to devices surrounding the robot.

Accordingly, in the third exemplary embodiment, a method for obtaining a speed parameter of the first motion with which the time from when the first motion is started to when positioning completes is minimized while the necessary precision in the second motion is being satisfied will be described.

Hereinafter, although the units illustrated in FIG. 9 will be described, the descriptions of the units that are common to those illustrated in FIG. 4 used to describe the first exemplary embodiment will be omitted. Upon executing the program 240, the CPU 201 illustrated in FIG. 3 functions as the actual output angle calculation unit 401, the leading end position calculation unit 402, an operation time calculation unit 409, and a parameter calculation unit 411 illustrated in FIG. 9. In addition, the HDD 204 serving as the storage unit functions as the positioning completion determination value storage unit 403, the change-over-time threshold value storage unit 405, and an operation parameter list storage unit 410.

The operation time calculation unit 409 calculates the operation time of the first motion. The operation time as used herein has its starting point at the time at which the servo control device 230 issues an instruction for the first motion to the servomotor 1 and its ending point at the time at which it is determined that positioning of the first motion has completed. This operation time corresponds to the sum of the time it takes to carry out an operation in response to an instruction for the first motion, which is timed in a time period preceding the above-described reference time point, and the time in which the leading end of the robot is vibrating after the reference time point. The operation time of the first motion includes the operation time of the robot apparatus and the stabilization time of the robot apparatus; and the shorter the operation time, the more desirable.

The method for determining whether positioning has completed is the same as the method described in the first exemplary embodiment.

The operation parameter list storage unit 410 stores a list of speed parameters of the first motion. A parameter on this list is transmitted to the servo control device 230 through the parameter storage unit 405, and thus the first motion is carried out.

The parameter calculation unit 411 obtains a speed parameter and an acceleration parameter of the first motion at which the operation time of the first motion obtained by the operation time calculation unit 409 is minimized, and transmits the obtained values to the parameter storage unit 405.

Subsequently, with reference to the flowchart illustrated in FIG. 10, a control operation of the control device 200 will be described. First, the operation time calculation unit 409 reads out the positioning completion determination value for obtaining the ending point of the operation time from the positioning completion determination value storage unit 403. In addition, the parameter storage unit 405 loads a first speed parameter on a list in the operation parameter list storage unit 410. The parameter storage unit 405 transmits the loaded value to the servo control device 230 (S21).

The servo control device 230 carries out a target motion in accordance with an instruction from the CPU 201 (S22:

feedback control step). To be more specific, under the control of the CPU 201, the servo control device 230 carries out the feedback control on the servomotors 1 so that the detection angles detected by the respective input-side encoders 10 become the target angles to be obtained when the leading end of the robot 100 has moved to the positioning completion position of the first motion.

Subsequently, the actual output angle calculation unit 401 starts the timer 206 to time the duration from an appropriate time point, such as the time at which the servo control device 230 starts an instruction for the first motion in step S22. This timing is carried out in a time period prior to the reference time point for obtaining the time in which the vibration width of the position of the leading end of the articulated robot relative to the positioning completion position converges within the convergence range, as described above. The measured time corresponds to the time it has taken to carry out the operation corresponding the instruction for the first motion.

The detection angles of the respective joints J1 through J6 detected by the output-side encoders 16 are obtained at given time intervals. Then, the actual output angle calculation unit 401 calculates the angles of rotation of the output shafts of the reduction gears 11 in the respective joints J1 through J6 at the given time intervals, on the basis of pulse signals from the output-side encoders 16 (S23). In other words, the actual output angle calculation unit 401 obtains the detection angles detected by the respective output-side encoders 16.

Subsequently, the leading end position calculation unit 402 obtains the position of the leading end of the robot 100 (position of TCP) on the basis of the angles of rotation of the output shafts of the reduction gears 11 in the respective joints obtained in step S23 (S24: leading end position calculation step). This leading end position is obtained by converting the angles of rotation of the respective joints through the forward kinematics. In other words, the leading end position calculation unit 402 obtains the position of the leading end of the robot 100 on the basis of the detection angles detected by the respective output-side encoders 16. Therefore, as described above, in a case in which the correspondence relationship between the leading end position and each joint angle is known, feedback control may be carried out on the servomotors 1 on the basis of the joint angles so that the joint angles are brought to the target angles, or the position of the leading end may be calculated.

Subsequently, the operation time calculation unit 409 obtains a time t2 that has its starting point at the time at which the timing with the timer 206 has started in S23 and its ending point at the time at which the vibrations have converged within the positioning completion width (within the convergence range) relative to the target position, on the basis of the vibration data of the leading end of the robot 100 (S25: timing step).

Subsequently, the parameter storage unit 405 loads a subsequent speed parameter on the list in the operation parameter list storage unit 410 and transmits the obtained value to the servo control device 230 (S26: operation parameter changing step).

At this point, if a subsequent value is stored in the operation parameter list storage unit 410 (S27: No), the processing returns to S22, and similar operations will be repeated. If a subsequent speed parameter is not stored (S27: Yes), it is determined that the previous speed parameter is the final value on the list, and the processing moves to the detection of a minimum time.

The parameter calculation unit 411 detects a minimum time t2min among the operation times measured up to this point and the speed parameter at that time (S28: minimum time detection step).

Lastly, the parameter storage unit 405 loads the speed parameter obtained in S28 from the parameter calculation unit 411 (S29: operation parameter setting step), and the processing is terminated. As the servo control device 230 loads this value and carries out the operation accordingly, the robot can be operated under the condition in which the time from when the first motion is started to when positioning completes can be minimized while the necessary precision in the second motion is being satisfied.

It is to be noted that the operation parameter in the present exemplary embodiment is not limited to the speed parameter, and an acceleration parameter or a jerk parameter that influence the vibrations that occur when the robot stops may also be added.

Thus far, the exemplary embodiments of the present invention have been described, but the present invention is not limited to the exemplary embodiments described above. In addition, the effects described in the exemplary embodiments of the present invention are indicated to merely illustrate the most suitable effects obtained through the present invention, and the effects of the present invention are not limited to those described in the exemplary embodiments of the present invention.

For example, although a case in which the articulated robot 100 is a vertically articulated robot has been described in the exemplary embodiments above, the articulated robot 100 may be a horizontally articulated robot (SCARA robot) or a parallel link robot.

In addition, the processing operations of the exemplary embodiments described above are carried out specifically by the CPU 201 of the control device 200. Therefore, a recording medium storing a program that implements the functionality described above may be supplied to the control device 200, and a computer (CPU or MPU) of the control device 200 may read out the program stored in the recording medium and execute the program so as to implement the functionality. In this case, the program itself read out from the recording medium implements the functionality of the exemplary embodiments described above, and the program itself or the recording medium storing the program constitutes the present invention.

In addition, although a case in which the computer readable recording medium is the HDD 204 and the program 240 is stored in the HDD 204 has been described in the exemplary embodiments above, the exemplary embodiments are not limited to such a configuration. The program 240 may be stored in any recording medium that is a computer readable recording medium. For example, the ROM 202, the external storage device 312, the recording disk 241, or the like illustrated in FIG. 3 may be used as the recording medium for supplying the program. Specific examples of the recording medium may be a flexible disk, a hard disk, an optical disc, a magneto-optical disk, a CD-ROM, a CD-R, a magnetic tape, a non-volatile memory card, and a ROM. In addition, the program in the exemplary embodiments described above may be downloaded through a network and executed by a computer.

In addition, the exemplary embodiments are not limited to a mode in which the functionality of the exemplary embodiments is implemented as the computer executes the program codes that have been read out. The exemplary embodiments encompass a case in which an operating system (OS) or the like operating on the computer carries out part or all of the actual processes on the basis of the instructions of the program codes and the functionality of the exemplary embodiments described above is implemented through the processes.

Furthermore, the program codes read out from the recording medium may be written into a memory provided in a functionality expansion board inserted into the computer or a functionality expansion unit connected to the computer. The exemplary embodiments encompass a case in which a CPU or the like provided in the functionality expansion board or the functionality expansion unit carries out part or all of the actual processes on the basis of the instructions of the program codes and the functionality of the exemplary embodiments described above is implemented through the processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-120156, filed Jun. 11, 2014, which is hereby incorporated by reference herein in its entirety.

What is claimed is:

1. A robot controlling method for controlling an articulated robot, the articulated robot including joint driving devices configured to drive respective joints of the articulated robot each including a servomotor, a reduction gear, a motor-side angle detector configured to detect an output angle of the servomotor, and a reduction gear-side angle detector configured to detect an output angle of the reduction gear, the robot controlling method comprising:
a feedback control step of carrying out feedback control on motion of the servomotors such that detection angles detected by the respective motor-side angle detectors become target angles;
a leading end position calculation step of obtaining a position of a leading end of the articulated robot based on detection angles detected by the respective reduction gear-side angle detectors;
a timing step of obtaining a time from a reference time point to a time point at which a vibration width, relative to a positioning completion position, of the position of the leading end of the articulated robot calculated in the leading end position calculation step converges within a convergence range;
a setting step of setting the time obtained in the timing step as a stopping duration, and
a control step of stopping the articulated robot for the stopping duration and thereafter returning to the feedback control step.

2. The robot controlling method according to claim 1, wherein, in the timing step, in response to the position of the leading end of the articulated robot being expressed in an orthogonal coordinate system having a plurality of axial directions, wherein the position of the leading end of articulated robot is represented by a location of the leading end of the articulated robot along each axial direction, the convergence range is set individually in each axial direction.

3. The robot controlling method according to claim 1, wherein, in the setting step, in a case in which the stopping duration is stored in a storage unit and the feedback control step, the leading end position calculation step, and the timing step are carried out again, in response to the time obtained in the timing step having changed relative to the stopping duration stored in the storage unit, the stopping duration stored in the storage unit is updated to the time obtained in the timing step.

4. The robot controlling method according to claim 1, wherein, in the setting step, in a case in which the stopping duration is stored in a storage unit and the feedback control step, the leading end position calculation step, and the timing step are carried out again, in response to the time obtained in the timing step having changed by a predetermined period of time or more relative to the stopping duration stored in the storage unit, the stopping duration stored in the storage unit is updated to the time obtained in the timing step.

5. The robot controlling method according to claim 1, further comprising:
a determination step of determining whether the time obtained in the timing step is equal to or greater than a threshold value set in advance; and
a notification step of issuing a warning in a case in which the determination step determines that the time obtained in the timing step is equal to or greater than the threshold value set in advance.

6. The robot controlling method according to claim 1, further comprising:
an operation parameter changing step of changing an operation parameter of a first motion of the robot in accordance with an operation parameter list;
a minimum time detection step of detecting a minimum operation time of the first motion; and
an operation parameter setting step of setting an operation parameter corresponding to a minimum time in the first motion.

7. The robot controlling method according to claim 6, wherein, in the timing step, in response to the position of the leading end of the articulated robot being expressed in an orthogonal coordinate system, the convergence range is set individually in each axial direction of the orthogonal coordinate system.

8. A method for manufacturing an assembly component by using an articulated robot, the articulated robot including joint driving devices configured to drive respective joints of the articulated robot each including a servomotor, a reduction gear, and a detector configured to detect an angle of an output side of the reduction gear, the method comprising:
causing the articulated robot to hold a first component and to carry out a first motion of the servomotors;
a leading end position calculation step of obtaining a position of a leading end of the articulated robot based on detection angles detected by the respective detectors; and
a control step of stopping at least one of a plurality of the servomotors in a case where the position of the leading end of the articulated robot calculated in the leading end position calculation step falls outside a predetermined range, and operating at least one of the plurality of the servomotors in a case where the position of the leading end of the articulated robot calculated in the leading end position calculation step falls within the predetermined range.

9. The method according to claim 8, wherein the position of the leading end of articulated robot is represented by a location of the leading end of the articulated robot along each axial direction of the articulated robot.

10. The method according to claim 9, wherein the predetermined range is set individually in each axial direction.

11. A robot controlling method for controlling an articulated robot, the articulated robot including joint driving devices configured to drive respective joints of the articulated robot each including a servomotor, a reduction gear, and a detector configured to detect an angle of an output side of the reduction gear, the robot controlling method comprising:
- a leading end position calculation step of obtaining a position of a leading end of the articulated robot based on detection angles detected by the respective detectors; and
- a control step of stopping at least one of a plurality of the servomotors in a case where the position of the leading end of the articulated robot calculated in the leading end position calculation step falls outside a predetermined range, and operating at least one of a plurality of the servomotors in a case where the position of the leading end of the articulated robot calculated in the leading end position calculation step falls within the predetermined range.

12. The robot controlling method according to claim 11, wherein the position of the leading end of articulated robot is represented by a location of the leading end of the articulated robot along each axial direction of the articulated robot.

13. The robot controlling method according to claim 12, wherein the predetermined range is set individually in each axial direction.

14. A robot controlling method for controlling an articulated robot, the articulated robot including joint driving devices configured to drive respective joints of the articulated robot each including a servomotor, a reduction gear, a motor-side angle detector configured to detect an output angle of the servomotor, and a reduction gear-side angle detector configured to detect an output angle of the reduction gear, the robot controlling method comprising:
- a feedback control step of carrying out feedback control on motion of the servomotor such that a first angle detected by the motor-side angle detector becomes target angle;
- a detecting step of obtaining a second angle of the reduction gear-side angle detectors;
- a timing step of obtaining a time from a reference time point to a time point at which a vibration width of the detection of the detection step starts to converge within a convergence range;
- a setting step of memorizing the time obtained in the timing step as a stopping duration; and
- a control step of controlling the articulated robot in operation so as to start a subsequent motion at a time when the stopping duration has elapsed since the reference time.

* * * * *